US012794077B2

(12) United States Patent
Tange

(10) Patent No.: US 12,794,077 B2
(45) Date of Patent: Nov. 10, 2026

(54) FLAMEPROOF SHEET, ASSEMBLED BATTERY, AND BATTERY PACK

(71) Applicant: IBIDEN CO., LTD., Gifu (JP)

(72) Inventor: Keisuke Tange, Gifu (JP)

(73) Assignee: IBIDEN CO., LTD., Gifu (JP)

( * ) Notice: Subject to any disclaimer, the term of this patent is extended or adjusted under 35 U.S.C. 154(b) by 620 days.

(21) Appl. No.: 18/274,553

(22) PCT Filed: Jan. 31, 2022

(86) PCT No.: PCT/JP2022/003680
§ 371 (c)(1),
(2) Date: Aug. 21, 2023

(87) PCT Pub. No.: WO2022/163853
PCT Pub. Date: Aug. 4, 2022

(65) Prior Publication Data

US 2024/0313345 A1 Sep. 19, 2024

(30) Foreign Application Priority Data

Feb. 1, 2021 (JP) ................................. 2021-014631
Dec. 23, 2021 (JP) ................................. 2021-209898

(51) Int. Cl.

| | |
|---|---|
| ***H01M 50/383*** | (2021.01) |
| ***H01M 50/209*** | (2021.01) |
| ***H01M 50/213*** | (2021.01) |
| ***H01M 50/291*** | (2021.01) |
| ***H01M 50/293*** | (2021.01) |

(52) U.S. Cl.
CPC ....... *H01M 50/383* (2021.01); *H01M 50/209* (2021.01); *H01M 50/213* (2021.01); *H01M 50/291* (2021.01); *H01M 50/293* (2021.01)

(58) Field of Classification Search
CPC ............ H01M 50/383; H01M 50/209; H01M 50/213; H01M 50/291; H01M 50/293
USPC ................................................ 429/156, 158
See application file for complete search history.

(56) References Cited

U.S. PATENT DOCUMENTS

2004/0137323 A1 7/2004 Sato
2014/0342231 A1 11/2014 Kawasaki et al.
2015/0064514 A1 3/2015 Wu et al.
(Continued)

FOREIGN PATENT DOCUMENTS

CN 103946157 A 7/2014
JP 2004-146161 A 5/2004
(Continued)

OTHER PUBLICATIONS

Extended European Search Report issued Dec. 13, 2024 by the European Patent Office in European Patent Application No. 22746072.2.

(Continued)

*Primary Examiner* — Kevin P Kerns
(74) *Attorney, Agent, or Firm* — Sughrue Mion, PLLC

(57) ABSTRACT

A flameproof sheet for use in an assembled battery in which a plurality of battery cells is connected serially or in parallel, the battery cells each having an electrode surface having an electrode and a peripheral surface orthogonal to the electrode surface and being disposed such that the peripheral surfaces face each other. The flameproof sheet contains a pair of flameproof materials and an elastic member disposed between the pair of flameproof materials.

10 Claims, 5 Drawing Sheets

(56) References Cited

U.S. PATENT DOCUMENTS

| | | | |
|---|---|---|---|
| 2019/0288280 | A1 | 9/2019 | Kawasaki et al. |
| 2020/0411818 | A1 | 12/2020 | Takeda |
| 2022/0115737 | A1 | 4/2022 | Shin et al. |
| 2022/0173463 | A1 | 6/2022 | Yamamoto et al. |
| 2022/0320626 | A1 | 10/2022 | Ando |
| 2024/0079721 | A1 | 3/2024 | Shin et al. |

FOREIGN PATENT DOCUMENTS

| | | | |
|---|---|---|---|
| JP | 2014-96271 | A | 5/2014 |
| JP | 2016-534518 | A | 11/2016 |
| JP | 2018-206604 | A | 12/2018 |
| JP | 2018-206605 | A | 12/2018 |
| KR | 10-2021-0004189 | A | 1/2021 |
| WO | 2019/167612 | A1 | 9/2019 |
| WO | 2020/203684 | A1 | 10/2020 |
| WO | 2021/166346 | A1 | 8/2021 |

OTHER PUBLICATIONS

International Search Report (PCT/ISA/210) issued Mar. 8, 2022 by the International Searching Authority in counterpart International Patent Application No. PCT/JP2022/003680.

Written Opinion (PCT/ISA/237) issued Mar. 8, 2022 by the International Searching Authority in counterpart International Patent Application No. PCT/JP2022/003680.

Office Action issued May 10, 2022 by the Japanese Patent Office in counterpart Japanese Patent Application No. 2021-209898.

Office Action issued May 10, 2022 by the Japanese Patent Office in counterpart Japanese Patent Application No. 2022-064736.

Office Action issued May 10, 2022 by the Japanese Patent Office in counterpart Japanese Patent Application No. 2022-064737.

Communication dated Mar. 11, 2026, issued by the China National Intellectual Property Administration in Chinese Application No. 202280012578.1.

FLAMEPROOF SHEET, ASSEMBLED BATTERY, AND BATTERY PACK

CROSS-REFERENCE TO RELATED APPLICATIONS

This application is a National Phase Entry of PCT International Application No. PCT/JP2022/003680 filed on Jan. 31, 2022, which claims priority to Japanese Patent Application No. 2021-014631 filed on Feb. 1, 2021, and Japanese Patent Application No. 2021-209898 filed on Dec. 23, 2021, the contents of all of which are incorporated herein by reference in their entirety.

TECHNICAL FIELD

The present invention relates to a flameproof sheet for use in assembled batteries to be employed in, for example, power tools and vehicles, and to an assembled battery and a battery pack which are to be mounted in power tools, vehicles, etc. and used as power sources for electric motors, etc.

BACKGROUND ART

Power tools generally include ones which are used in the state of being connected to the so-called commercial power source and ones which have an assembled battery mounted therein that serves as a power source for an electric motor for driving. The power tools having an assembled battery mounted therein are frequently used from the point of view of the excellent handleability, etc.

An assembled battery is a battery in which a plurality of battery cells is connected serially or in parallel. For example, battery cells are enclosed in a battery case made of, for example, a polycarbonate and united therewith, and the assembled battery is housed inside a power tool.

Mainly used as such battery cells to be mounted in power tools are lithium-ion secondary batteries, which can have higher capacities and higher outputs than lead acid batteries and nickel-hydrogen batteries. However, in case where thermal runaway has occurred in one battery cell because of internal short-circuiting, overcharge, or the like of the battery (that is, in case of "abnormality"), it is possible that heat transfer to adjoining another battery cell might occur to cause thermal runaway to the adjoining another battery cell.

In recent years, electric vehicles driven by electric motors, hybrid vehicles, and the like are being developed enthusiastically from the standpoint of environmental protection. The electric vehicles, hybrid vehicles, and the like have assembled batteries mounted therein each including a plurality of battery cells connected serially or in parallel and serving as a power source for an electric motor for driving. Also, as such battery cells for use in vehicles, lithium-ion secondary batteries capable of having a high capacity and a high output are mainly employed. There is a possibility that these battery cells might undergo thermal runaway like the battery cells housed inside the power tools as described above.

As a measure against the occurrence of thermal runaway described above, Patent Document 1, for example, proposes an assembled battery in which in case where abnormal heat generation has occurred, for example, because an overcurrent has flowed into a battery cell, the burning can be prevented or inhibited from spreading to adjoining battery cells. The assembled battery described in Patent Document 1 is configured of a plurality of battery cells and a block for holding the battery cells, the block being made of a metallic material and composed of a plurality of small blocks. The dimensions of the gap between the block and each battery cell are regulated.

Patent Document 1 states that in the assembled battery described therein, which has such configuration, heat can be rapidly diffused because the block holding the battery cells is made of a metallic material.

Patent Document 2 discloses a battery pack intended to attain an improvement in the heat dissipation properties of secondary batteries and mitigation of performance deterioration. The battery pack described in Patent Document 2 is one which includes a plurality of secondary batteries enclosed in a case and in which a plate-shaped rubber sheet having a heat transfer coefficient not lower than a given value and being changed in shape by pressure has been disposed between the plurality of batteries and the case.

Patent Document 2 states that since the heat transfer coefficient of the rubber sheet is relatively high, the heat of the secondary batteries can be satisfactorily discharged via the case. Furthermore, this battery pack can be prevented from being damaged w % ben dropped, since the rubber sheet has elasticity.

CITATION LIST

Patent Literature

Patent Document 1: JP2014-96271A
Patent Document 2: JP2004-146161A

SUMMARY OF INVENTION

Technical Problems

Incidentally, in case where thermal runaway occurs in a battery cell, a gas is generated within this battery to elevate the internal pressure and thus cause a deformation of the battery cell. This deformation, when large, may cause breakage of the case.

Such a battery-cell deformation occurs slightly also in cases when battery cells which have been fabricated into an assembled battery are subjected to charge/discharge cycling (that is, "during ordinary use"). In cases when the internal pressure of battery cells repeatedly increases and decreases during charge/discharge, the battery cells repeatedly undergo pressing by the case and relaxation thereof and this is causative of a decrease in battery performance.

Although the assembled battery according to Patent Document 1 is capable of rapidly diffusing heat since the block holding the battery cells is made of a metallic material, this assembled battery has no provision against the breakage of the battery case and the decrease in battery performance due to a battery-cell deformation.

In addition, the assembled battery described in Patent Document 1 necessitates a plurality of blocks and the blocks need to be designed in accordance with the electronic appliance, power tool, or the like in which the assembled battery is to be mounted, since the gaps between the blocks and the battery cells are varied. There is hence a problem in that the design of the blocks and fabrication of the assembled battery are complicated.

Furthermore, in the battery pack described in Patent Document 2, it is not considered that in the case where the thermal runaway occurs in a battery cell, the thermal runaway in an adjoining battery cell is to be inhibited.

An object of the present invention, which has been achieved in view of those problems, is to provide: a flameproof sheet which can inhibit heat transfer between battery cells in case of abnormality and inhibit battery-case breakage and a decrease in battery performance due to battery-cell deformations; and an assembled battery and a battery pack which are easy to design and fabricate and in which heat transfer between the battery cells can be inhibited and battery-case breakage and a decrease in battery performance can be inhibited.

Solution to the Problems

The object of the present invention is accomplished with the following configuration [1] regarding a flameproof sheet.

[1] A flameproof sheet for use in an assembled battery in which a plurality of battery cells is connected serially or in parallel, the battery cells each having an electrode surface having an electrode and a peripheral surface orthogonal to the electrode surface and being disposed such that the peripheral surfaces face each other, the flameproof sheet including a pair of flameproof materials and an elastic member disposed between the pair of flameproof materials.

Preferred embodiments of the present invention according to the flameproof sheet relate to the following [2] to [10].

[2] The flameproof sheet according to [1] wherein the elastic member has a plurality of grooves extending from one edge surface thereof orthogonal to surfaces thereof facing the flameproof materials to the other edge surface.

[3] The flameproof sheet according to [1] or [2] wherein the elastic member has a plurality of through holes piercing the elastic member from one edge surface thereof orthogonal to surfaces thereof facing the flameproof materials to the other edge surface.

[4] The flameproof sheet according to any one of [1] to [3] wherein the elastic member is made of a rubber or an elastomer.

[5] The flameproof sheet according to any one of [1] to [4] wherein the flameproof materials contain at least one kind of inorganic particles, organic fibers, or inorganic fibers.

[6] The flameproof sheet according to [5] characterized in that the inorganic particles are particles of at least one inorganic material selected from among oxide particles, carbide particles, nitride particles, and inorganic hydrate particles.

[7] The flameproof sheet according to any one of [1] to [6] characterized in that the flameproof materials include first inorganic fibers and second inorganic fibers, the first inorganic fibers and the second inorganic fibers differing from each other in at least one property selected from among average fiber diameter, shape, and glass transition point.

[8] The flameproof sheet according to [7] characterized in that the first inorganic fibers have a larger average fiber diameter than the second inorganic fibers, and the first inorganic fibers are linear or acicular and the second inorganic fibers are dendritic or curly.

[9] The flameproof sheet according to [7] characterized in that the first inorganic fibers are amorphous fibers.

the second inorganic fibers are fibers of at least one kind selected from between amorphous fibers, having a higher glass transition point than the first inorganic fibers, and crystalline fibers, and the first inorganic fibers have a larger average fiber diameter than the second inorganic fibers.

[10] The flameproof sheet according to [7] wherein the flameproof materials contain inorganic particles, the inorganic particles comprising particles of at least one kind selected from among nanoparticles, hollow particles, and porous particles, the first inorganic fibers are amorphous fibers, and the second inorganic fibers are inorganic fibers of at least one kind selected from between amorphous fibers, having a higher glass transition point than the first inorganic fibers, and crystalline fibers.

The object of the present invention is accomplished also with the following configurations [11] and [12] regarding an assembled battery.

[11] An assembled battery including a plurality of battery cells and the flameproof sheet according to any one of [1] to [10], wherein the plurality of battery cells are connected directly or in parallel.

[12] An assembled battery in which a plurality of battery cells that each have an electrode surface having an electrode and a peripheral surface orthogonal to the electrode surface and that are disposed such that the peripheral surfaces face each other are connected serially or in parallel.

the assembled battery including the battery cells, a flameproof material covering at least a part of the peripheral surfaces of the battery cells, and an elastic member covering at least a part of a region of the peripheral surfaces of the battery cells which is covered with the flameproof material.

Preferred embodiments of the present invention according to the assembled batteries relate to the following [13] to [16].

[13] The assembled battery according to [12] wherein the elastic member covers the flameproof-material-covered region along a peripheral direction of the battery cells to press the battery cells.

[14] The assembled battery according to [13] wherein the elastic member is a tubular body which is open at both ends.

[15] The assembled battery according to [14] wherein the elastic member has a plurality of grooves extending in an inner surface of the tubular body from one end to the other end of the tubular body.

[16] The assembled battery according to [14] or [15] wherein the elastic member has a plurality of through holes piercing the tubular body from one end to the other end thereof.

The object of the present invention is accomplished also with the following configuration [17] regarding a battery pack.

[17] A battery pack in which the assembled battery according to any one of [11] to [16] is encased in a battery case.

Advantageous Effects of Invention

Since the flameproof sheet of the present invention includes a pair of flameproof materials and an elastic member disposed between the pair of flameproof materials, not only it is possible to inhibit the transfer of heat between battery cells in case of abnormality but also the elastic member can flexibly deform in accordance with deformations of the battery cells to inhibit battery-case breakage and a decrease in battery performance.

Since the assembled battery of the present invention includes a flameproof material covering at least a part of the peripheral surfaces of the battery cells, it is possible to inhibit the transfer of heat between battery cells in case of abnormality. Since this assembled battery includes an elastic member covering at least a part of the peripheral surfaces of the flameproof material, the elastic member can flexibly deform in accordance with deformations of the battery cells to inhibit battery-case breakage and a decrease in battery performance. Furthermore, in cases when the elastic member is a tubular body, this elastic member has stretchability and can hence be easily attached to each battery cell, without the need of changing the designs of the elastic member and battery case in accordance with the kind of battery cells.

Since the battery pack of the present invention includes the assembled battery encased, not only the transfer of heat between the battery cells can be inhibited and the propagation of thermal runaway can be prevented, but also this battery pack can be easily fabricated.

DESCRIPTION OF EMBODIMENTS

Figure 1:
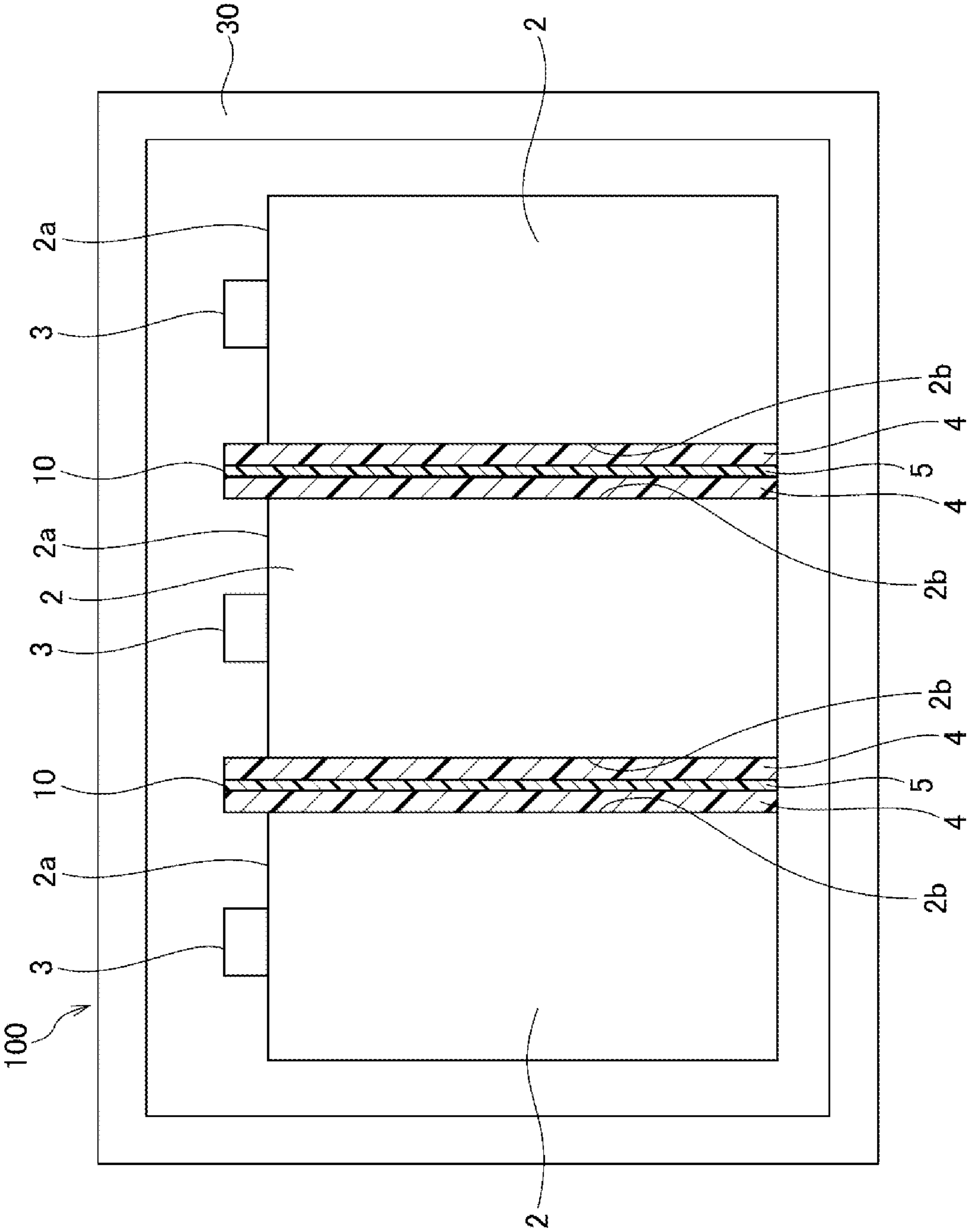
FIG. 1 is a cross-sectional view schematically illustrating an assembled battery employing a flameproof sheet according to an embodiment of the present invention.

The present inventor diligently made investigations in order to provide an assembled battery in which heat transfer between the battery cells is inhibited in case of abnormality and any deformation of battery cells does not affect the battery case or the battery performance.

As a result, the inventor has discovered that the problems described above can be eliminated by covering at least a part of the peripheral surface of each battery cell with a flameproof material and covering at least a part of the flameproof-material-covered region with an elastic member.

Embodiments of the present invention are described in detail below while referring to the drawings. The present invention is not limited to the following embodiments, and can be modified at will so long as the modifications do not depart from the spirit of the invention.

[Flameproof Sheet]

FIG. 1 is a cross-sectional view schematically illustrating an assembled battery employing a flameproof sheet according to an embodiment of the present invention.

Each battery cell 2 has an electrode surface 2*a* having an electrode 3 and a peripheral surface 2*b* that is a surface orthogonal to the electrode surface 2*a*. The battery cells 2 have been disposed so that the peripheral surfaces 2*b* thereof face each other, and are connected serially or in parallel, with the electrodes 3 and a connector (not shown), etc. interposed therebetween.

Flameproof sheets 10 have been disposed between the plurality of battery cells 2. The flameproof sheets 10 each include a pair of flameproof materials 4 and an elastic member 5 disposed between the pair of flameproof materials 4. That is, as FIG. 1 shows, each flameproof material 4 covers at least a part of the peripheral surface of a battery cell 2, and the elastic member 5 covers at least a part of the region covered with the flameproof material 4. The assembled battery 100 has been configured by encasing the plurality of battery cells 2 and the flameproof materials 4 in a battery case 30.

The flameproof sheet 10, which has such configuration, disposed between battery cells 2 functions as follows. When thermal runaway has occurred in one of the battery cells in case of abnormality, the flameproof materials 4 inhibit the transfer of the heat to the adjoining battery cell. Hence, the other battery cell, which adjoins said one battery cell, can be inhibited from receiving the heat and the thermal runaway can be prevented from propagating.

The flameproof sheet 10 includes an elastic member 5 disposed between the pair of flameproof materials 4, and this elastic member 5 has both the effect of inhibiting the battery cells 2 from deforming and the effect of absorbing deformations of the battery cells 2. That is, when a battery cell 2 deforms in case of abnormality, the elastic member 5 flexibly deforms in accordance with the deformation of the battery cell 2 while inhibiting the deformation of the battery cell 2. It is hence possible to inhibit a pressure from being unnecessarily applied to the battery cells 2.

In this embodiment, the flameproof materials 4 have been disposed so as to be in contact with a part of the peripheral surfaces of the battery cells 2, and the elastic members 5 are not in contact with the battery cells 2. This configuration is advantageous in that when a battery cell 2 has heated up to a high temperature in case of abnormality, the heat is less apt to reach the elastic member 5 and, hence, the elastic member 5 can be prevented from melting. Also, in cases when the battery cells 2 have changed in temperature during ordinary use, the disposition of a flameproof material 4 between each battery cell 2 and the elastic member 5 makes the elastic member 5 undergo a reduced temperature change and can prevent the elastic member 5 from deteriorating.

It is, however, possible, depending on the material of the elastic member 5, to employ a flameproof sheet configured so that the elastic member 5 is in contact with the peripheral surface 2*b* of a battery cell 2, that is, a flameproof material 4 has been disposed between a pair of elastic members 5. Specifically, elastic members 5 are disposed in the positions of the flameproof materials 4 shown in FIG. 1 and a flameproof material 4 is disposed in the position of the elastic member 5 in FIG. 1. Since there are cases where the flameproof materials 4 contain inorganic particles having an extremely small particle diameter, such as nanoparticles, as will be described later, the configuration including a flameproof material 4 disposed between a pair of elastic members 5 can prevent the inorganic particles from shedding from the flameproof material 4. It is preferred to suitably select the positional relationship between the elastic member 5 and the flameproof material 4 in such a manner while taking account of the material of the flameproof material 4, the heat resistance, elasticity, and durability of the elastic member 5, etc.

Incidentally, the battery cells 2 undergo slight deformations during charge/discharge cycling, i.e., during ordinary use. That is, in cases when the gap between the plurality of battery cells 2 is small, the battery cells 2, when having expanded, each are pressed by an opposed battery cell 2 and the battery cells 2, when having contracted, are released from the pressure. Such repetitions of the pressing of the battery cells 2 and the relaxation are causative of a decrease in battery performance.

In this embodiment, since the elastic member 5 deforms flexibly in accordance with even slight deformations of the battery cells 2 in charge/discharge cycling during ordinary use, it is possible to inhibit the battery cells 2 from decreasing in battery performance.

In this embodiment, the battery cells 2 may be prismatic or round.

Although each flameproof sheet 10 has been disposed between a plurality of battery cells 2 in this embodiment, the flameproof sheet 10 may cover the peripheral surface 2*b* of a battery cell 2 along the peripheral direction. For example, use can be made of a flameproof sheet 10 configured so that a flameproof material 4 is wound around the peripheral surface 2*b* of a battery cell 2 along the peripheral direction and an elastic member 5 only is disposed between adjoining battery cells. Use may also be made of a flameproof sheet 10 configured so that a flameproof material 4 is wound around the peripheral surface 2*b* of a battery cell 2 along the peripheral direction and an elastic member 5 is disposed so as to be wound around the peripheral surface 2*b* of the flameproof material 4.

Examples of an assembled battery in which a flameproof material 4 and an elastic member 5 have been disposed so as to cover the peripheral surface 2*b* of a battery cell 2 along the peripheral direction and of a battery pack including this assembled battery are explained in detail below.

[Battery Pack]

Figure 2:
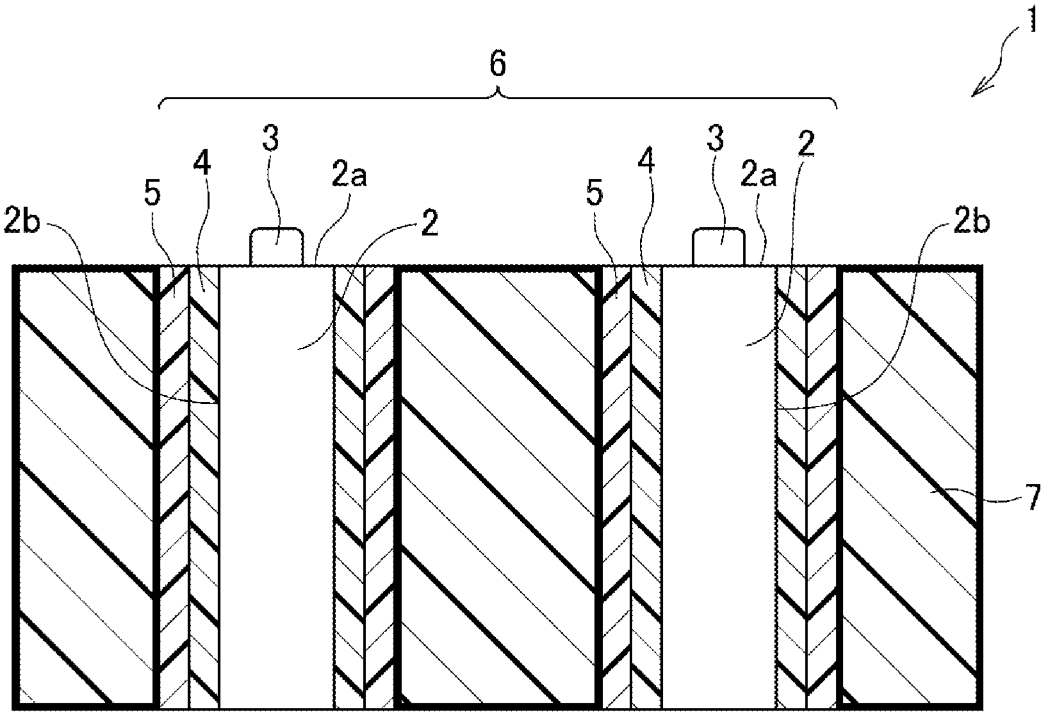
FIG. 2 is a cross-sectional view schematically illustrating a battery pack according to an embodiment of the present invention.

FIG. 2 is a cross-sectional view schematically illustrating the battery pack according to an embodiment of the present invention.

The battery pack 1 is one obtained by encasing an assembled battery 6, which is described in detail below, in a battery case 7 made of, for example, a resin.

[Assembled Battery]

Each battery cell 2 has an electrode surface 2*a* having an electrode 3 and a peripheral surface 2*b* that is a surface orthogonal to the electrode surface 2*a*. The battery cells 2 have been disposed so that the peripheral surfaces 2*b* thereof face each other, and are connected serially or in parallel, with the electrodes 3 and a connector (not shown), etc. interposed therebetween.

The peripheral surface 2*b* of each battery cell 2 is covered with a flameproof material 4 and the peripheral surface of the flameproof material 4 is covered with an elastic member 5, thereby configuring the assembled battery 6. The elastic member 5 is a tubular body which is open at both ends, and covers the peripheral surfaces of the battery cell 2 and flameproof material 4 along the peripheral direction. In this embodiment, the expression "both ends of the elastic member 5 (tubular body)" means one longitudinal-direction (top-bottom direction in FIG. 2) end of the elastic member 5 and the other end thereof, namely, the open ends of the tubular body.

In the assembled battery 6 having such configuration, the peripheral surface 2*b* of each battery cell 2 is covered with the flameproof material 4. Because of this, when thermal runaway has occurred in one of the battery cells in case of abnormality, the flameproof material 4 inhibits the transfer of the heat to the periphery. Hence, the other battery cell, which adjoins said one battery cell, can be inhibited from receiving the heat and the thermal runaway can be prevented from propagating.

The elastic member 5, which covers the peripheral surfaces of the battery cell 2 and flameproof material 4 to press the battery cell 2, has both the effect of inhibiting the battery cell 2 from deforming and the effect of absorbing any deformation of the battery cell 2. That is, when the battery cell 2 deforms in case of abnormality, the elastic member 5 deforms flexibly in accordance with the deformation of the battery cell 2 while inhibiting the deformation of the battery cell 2. It is hence possible to inhibit the battery case 7 from breaking.

Furthermore, even when the battery cell 2 has heated up to a high temperature in case of abnormality and exploded due to an increase in internal pressure, the covering of the battery cell 2 with the elastic member 5 makes it possible to avoid a trouble, for example, that fragments of the battery cell 2, an organic electrolytic liquid present in the battery cell 2, etc. reach other battery cells 2 to exert an adverse influence.

Incidentally, each battery cell 2 undergoes slight deformations during charge/discharge cycling, i.e., during ordinary use. That is, in cases when the gap between the battery cell 2 and the battery case 7 is small, the battery cell 2, when having expanded, is pressed by the battery case 7 and the battery cell 2, when having contracted, is released from the pressure by the battery case 7. Such repetitions of the pressing of the battery cell 2 and the relaxation are causative of a decrease in battery performance.

In this embodiment, since the elastic member 5 deforms flexibly in accordance with even slight deformations of the battery cell 2 in charge/discharge cycling during ordinary use, it is possible to inhibit the battery cell 2 from decreasing in battery performance.

In this embodiment, the battery cells 2 may be prismatic or round.

The assembled battery has preferably been configured so that, as FIG. 2 shows, each flameproof material 4 covers all of the peripheral surface of the battery cell 2 to press the battery cell 2. However, a configuration in which a part of the peripheral surface remains uncovered, as shown in FIG. 1 can be favorably used according to need so long as such configuration can inhibit the propagation of thermal runaway such as that described above.

The elastic member 5 need not cover all of the peripheral surface of the battery cell 2 covered with the flameproof material 4, and may be one which can be expected to produce the above-described effects of the elastic member 5. For example, the elastic member 5 may be one which covers a part of the peripheral surface 2*b* of the battery cell 2 as shown in FIG. 1. Even with such a configuration, the effects of the elastic member 5 can be sufficiently obtained as stated above.

Next, the flameproof materials 4 and elastic members 5 which are components of the assembled battery according to this embodiment are described in detail.

[Flameproof Materials]

The flameproof materials 4 to be used in the assembled battery 6 according to this embodiment preferably contain organic fibers and/or inorganic fibers, and more preferably further contain inorganic particles according to need. In this embodiment, use can be made of these materials which have been processed into, for example, a sheet shape. Since it is important that materials for constituting the flameproof materials 4 should have heat-insulating properties, these materials are selected from among materials having high heat-insulating performance.

Examples indexes to heat-insulating performance include heat transfer coefficient. In this embodiment, the flameproof materials 4 have a heat transfer coefficient of preferably less than 1 (W/m·K), more preferably less than 0.5 (W/m·K), still more preferably less than 0.2 (W/m·K). The heat transfer coefficient of the flameproof materials 4 is yet still more preferably less than 0.1 (W/m·K), even still more preferably less than 0.05 (W/m·K), especially preferably less than 0.02 (W/m·K).

The heat transfer coefficient of a flameproof material 4 can be measured in accordance with "Test Method for Heat Transfer Coefficients of Refractories" described in JIS R 2251.

<Inorganic Particles>

The inorganic particles are preferably ones made of one or more compounds having heat resistance. Either inorganic particles made of a single material may be used, or inorganic particles of two or more kinds differing in material may be used in combination. In cases when inorganic particles of two or more kinds differing in heat-transfer-inhibiting effect are used in combination, heat-generating objects can be cooled in multiple stages and a heat sink action can be exhibited over a wider temperature range, making it possible to improve the heat-insulating performance. In the case where inorganic particles of two or more kinds are contained, preferred materials, shapes, and particle diameters of each kind of inorganic particles are as follows.

Figure 3:
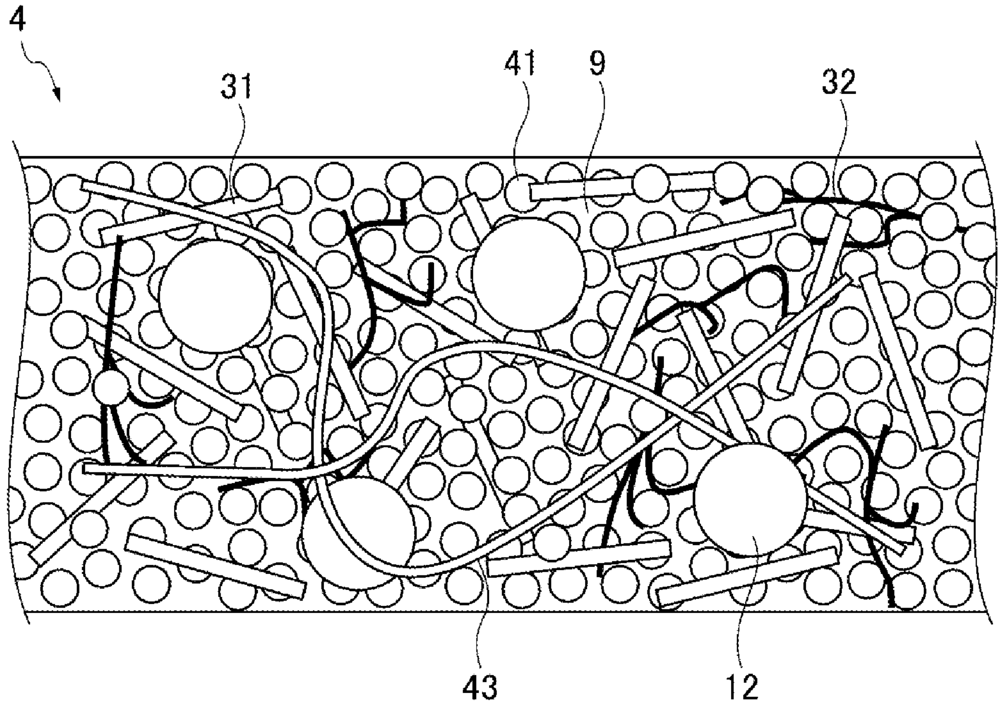
FIG. 3 is a cross-sectional view schematically illustrating a flameproof material containing two kinds of inorganic particles.

FIG. 3 is a cross-sectional view schematically illustrating a flameproof material 4 containing two kinds of inorganic particles. The flameproof material 4 shown in FIG. 3 contains, as examples, first inorganic particles 41 and second inorganic particles 12 and further contains two kinds of inorganic fibers (first inorganic fibers 31 and second inorganic fibers 32), organic fibers 43, and a binder 9, which will be described later.

As the first inorganic particles 41 and the second inorganic particles 12, it is preferred to use particles of at least one inorganic material selected from among oxide particles, carbide particles, nitride particles, and inorganic hydrate particles, from the standpoint of heat-transfer-inhibiting effect. More preferred is to use oxide particles. It is also possible to use silica nanoparticles, metal oxide particles, microporous particles, inorganic balloons such as hollow silica particles, particles made of a heat-expandable inorganic material, particles made of a hydrous porous material, or the like. The inorganic particles are explained in greater detail below; in the following explanation, inorganic particles having smaller diameters are referred to as first inorganic particles 41 and inorganic particles having larger particle diameters are referred to as second inorganic particles 12.

<First Inorganic Particles>

(Oxide Particles)

Oxide particles have high refractive indexes and are highly effective in irregularly reflecting light. Use of oxide particles as the inorganic particles hence makes it possible to inhibit radiational heat transfer in a high-temperature range as in, especially, abnormal heat generation. Examples of the oxide particles include silica ($SiO_2$), titania ($TiO_2$), mullite ($Al_6O_{13}Si_2$), zirconia ($ZrO_2$), magnesia ($MgO$), zircon ($ZrSiO_4$), barium titanate ($BaTiO_3$), zinc oxide ($ZnO$), and alumina ($Al_2O_3$). However, the oxide particles are not limited to those examples. That is, only one kind selected from among those particulate oxide materials usable as the inorganic particles may be used, or two or more kinds of oxide particles may be used. In particular, silica is an ingredient having high heat-insulating properties, and titania is an ingredient having a high refractive index as compared with other metal oxides and is highly effective in irregularly reflecting light to block radiation heat in a high-temperature range of 500° C. and above. It is hence most preferred to use silica and titania as the oxide particles.

(Average Primary-Particle Diameter of Oxide Particles: 0.001-50 μm)

The particle diameters of the oxide particles may affect the effect of reflecting radiation heat. Hence, by limiting the average primary-particle diameter to a given range, even higher heat-insulating properties can be obtained.

Specifically, in cases when the oxide particles have an average primary-particle diameter of 0.001 μm or larger, these oxide particles are sufficiently larger than the wavelengths of light contributing to heating and irregularly reflect the light efficiently. Consequently, radiational heat transfer within the flameproof materials 4 in the high-temperature range of 500° C. and above is inhibited and the heat-insulating properties can be further improved.

Meanwhile, in cases when the oxide particles have an average primary-particle diameter of 50 μm or less, the oxide particles, even when compressed, do not increase in the area or number of interparticulate contact points and are less apt to form paths for conductive heat transfer. It is hence possible to reduce influences on the heat-insulating properties in an ordinary-temperature range, where conductive heat transfer is dominant.

In the present invention, an average primary-particle diameter can be determined by examining the particles with a microscope and averaging the particle diameters of arbitrarily selected 10 particles while comparing the particle diameters with a standard scale.

(Nanoparticles)

In the present invention, the term "nanoparticles" means particles which are spherical or approximately spherical and have an average primary-particle diameter less than 1 μm, on the order of nanometer. Nanoparticles have a low density and hence inhibit conductive heat transfer. In cases when nanoparticles are used as the inorganic particles, voids are more finely dispersed and, hence, excellent heat-insulating properties which inhibit convectional heat transfer can be obtained. Because of this, use of nanoparticles is preferred in that when the battery is used in an ordinary temperature range, heat transfer between adjacent nanoparticles can be inhibited.

Furthermore, in cases when nanoparticles, which have a small average primary-particle diameter, are used as the oxide particles, the flameproof material 4 can be inhibited from undergoing enhanced conductive heat transfer even when the battery cell has expanded due to thermal runaway and the expansion has compressed the flameproof material 4 and heightened the density of an inner portion of the flameproof material. This seems to be because the nanoparticles are apt to show electrostatic repulsion to form fine voids between the particles and have a low bulk density and are hence packed so as to have cushioning properties.

In the case of using nanoparticles as the inorganic particles in the present invention, the material thereof is not particularly limited so long as the nanoparticles meet the definition of nanoparticles. For example, silica nanoparticles are a material having high heat-insulating properties and have a feature of having small interparticulate contact points. Consequently, the quantity of heat conducted by silica nanoparticles is smaller than in the case of using silica particles having a large particle diameter. In addition, since generally available silica nanoparticles have bulk densities of about 0.1 ($g/cm^3$), the silica nanoparticles in a flameproof material do not increase considerably in the size (area) or number of contact points therebetween and can retain the heat-insulating properties, even when, for example, the battery cell disposed so as to adjoin the flameproof material has thermally expanded to impose high compressive stress on the flameproof material. It is therefore preferred to use silica nanoparticles as the nanoparticles. Usable as the silica nanoparticles are wet-process silica, dry-process silica, aerogel, and the like.

(Average Primary-Particle Diameter of Nanoparticles: 1-100 nm)

By limiting the average primary-particle diameter of the nanoparticles to a given range, even higher heat-insulating properties can be obtained.

Specifically, by regulating the nanoparticles so as to have an average primary-particle diameter of 1-100 nm, convectional heat transfer and conductive heat transfer within the flameproof materials 4 especially in a temperature range below 500° C. can be inhibited and the heat-insulating properties can be further improved. Even in cases when compressive stress has been imposed, the voids remaining among the nanoparticles and contact points between many particles inhibit conductive heat transfer, enabling the flameproof materials 4 to retain the heat-insulating properties.

The average primary-particle diameter of the nanoparticles is more preferably 2 nm or larger, still more preferably 3 nm or larger. Meanwhile, the average primary-particle diameter of the nanoparticles is more preferably 50 nm or less, still more preferably 10 nm or less.

(Inorganic Hydrate Particles)

Inorganic hydrate particles, when heated to a temperature not lower than the pyrolysis initiation temperature upon reception of heat from a heat-generating object, decompose thermally to release the crystal water included in itself and lower the temperatures of the heat-generating object and periphery thereof. That is, inorganic hydrate particles perform the so-called "heat sink action". After the release of the crystal water, the particles are porous and perform heat-insulating action due to the innumerable voids.

Specific examples of the inorganic hydrate include aluminum hydroxide ($Al(OH)_3$), magnesium hydroxide ($Mg(OH)_2$), calcium hydroxide ($Ca(OH)_2$), zinc hydroxide ($Zn(OH)_2$), iron hydroxide ($Fe(OH)_2$), manganese hydroxide ($Mn(OH)_2$), zirconium hydroxide ($Zr(OH)_2$), and gallium hydroxide ($Ga(OH)_3$).

For example, aluminum hydroxide has about 35% crystal water, and decomposes thermally to release the crystal water as shown by the following formula and exhibits a heat sink action. After having released the crystal water, the aluminum compound is porous alumina ($Al_2O_3$) and functions as a flameproof material.

$$2Al(OH)_3 \rightarrow Al_2O_3 + 3H_2O$$

As will be described later, a flameproof material 4 and an elastic member 5 according to this embodiment are favorably disposed, for example, between battery cells. However, since a battery cell which is undergoing thermal runaway heats up rapidly to a temperature exceeding 200° C. and continues to heat up to around 700° C., the inorganic particles are preferably made of an inorganic hydrate having a pyrolysis initiation temperature of 200° C. or higher.

The inorganic hydrates mentioned above have the following pyrolysis initiation temperatures: aluminum hydroxide, about 200° C.; magnesium hydroxide, about 330° C.; calcium hydroxide, about 580° C.; zinc hydroxide, about 200° C.; iron hydroxide, about 350° C.; manganese hydroxide, about 300° C.: zirconium hydroxide about 300° C.; and gallium hydroxide, about 300° C. These pyrolysis initiation temperatures are substantially within the temperature range over which the battery cell in which thermal runaway is occurring heats up rapidly, and are effective in efficiently inhibiting the temperature increase. Those inorganic hydrates are hence preferred.

(Average Secondary-Particle Diameter of Inorganic Hydrate Particles, 0.01-200 μm)

In the case of using inorganic hydrate particles as the first inorganic particles 41, if the inorganic hydrate particles have too large an average particle diameter, then first inorganic particles 41 (inorganic hydrate) lying around the center of the flameproof material 4 require time to some degree before the particles can heat up to the pyrolysis initiation temperature. There are hence cases where the first inorganic particles 41 lying around the center of the flameproof material 4 are not completely pyrolyzed. Because of this, the inorganic hydrate particles have an average secondary-particle diameter of preferably 0.01-200 μm, more preferably 0.05-100 μm.

(Nitride Particles)

Preferred examples of the nitride particles include boron nitride (BN).

(Carbide Particles)

Preferred examples of the carbide particles include boron carbide ($B_4C$).

(Particles made of Heat-expandable Inorganic Material)

Examples of the heat-expandable inorganic material include vermiculite, bentonite, mica, and perlite.

(Particles made of Hydrous Porous Material)

Specific examples of the hydrous porous material include zeolite, kaolinite, montmorillonite, acid clay, diatomaceous earth, wet-process silica, dry-process silica, aerogel, mica, and vermiculite.

(Inorganic Balloons)

The flameproof materials 4 to be used in the present invention may contain inorganic balloons as the inorganic particles.

The inclusion of inorganic balloons can inhibit convectional heat transfer and conductive heat transfer within the flameproof materials 4 in a temperature range below 500° C. and can further improve the heat-insulating properties of the flameproof materials 4.

As the inorganic balloons, use can be made of at least one kind selected from among shirasu balloons, silica balloons, fly ash balloons, pearlite balloons, and glass balloons.

(Content of Inorganic Balloons: 60 Mass % or Less with Respect to Whole Mass of Flameproof Material)

The content of the inorganic balloons is preferably 60 mass % or less with respect to the whole mass of the flameproof material.

(Average Particle diameter of Inorganic Balloons: 1-100 μm)

The inorganic balloons have an average particle diameter of preferably 1-100 μm.

<Second Inorganic Particles>

In the case where the flameproof materials 4 contain two kinds of inorganic particles, the second inorganic particles 12 are not particularly limited so long as the second inorganic particles 12 differ from the first inorganic particles 41 in material, particle diameter, etc. As the second inorganic particles 12, use can be made of oxide particles, carbide particles, nitride particles, inorganic hydrate particles, silica nanoparticles, metal oxide particles, microporous particles, inorganic balloons such as hollow silica particles, particles made of a heat-expandable inorganic material, particles made of a hydrous porous material, or the like. Details of these particulate materials are as described hereinabove.

Nanoparticles are extremely low in conductive heat transfer and enable the flameproof materials to retain excellent heat-insulating properties even under compressive stress. Metal oxide particles such as titania are highly effective in blocking radiation heat. In cases when inorganic particles having a large diameter and inorganic particles having a small diameter are used, the small-diameter inorganic particles come into interstices among the large-diameter inorganic particles, resulting in a denser structure. The heat-transfer-inhibiting effect can hence be improved. Consequently, in the case where nanoparticles are used as the first inorganic particles 51, it is preferable that particles made of a metal oxide and having a larger diameter than the first inorganic particles 41 are further incorporated as the second inorganic particles 12 into the flameproof materials 4.

Examples of the metal oxide include silicon oxide, titanium oxide, aluminum oxide, barium titanate, zinc oxide, zircon, and zirconium oxide. In particular, titania is an ingredient having a high refractive index as compared with other metal oxides and is highly effective in irregularly reflecting light to block radiation heat in a high-temperature range of 500° C. and above. It is hence most preferred to use titania.

(Average Primary-Particle Diameter of Second Inorganic Particles)

In the case where second inorganic particles 12 made of a metal oxide are contained in the flameproof materials 4, the second inorganic particles 12, when having an average primary-particle diameter of 1-50 μm, can efficiently inhibit radiational heat transfer in the high-temperature range of 500° C. and above. The average primary-particle diameter of the second inorganic particles 12 is more preferably 5-30 μm, most preferably 10 μm or less.

(Contents of First Inorganic Particles and Second Inorganic Particles)

In the case where the first inorganic particles 41 are silica nanoparticles and the second inorganic particles 12 are a metal oxide, when the content of the first inorganic particles 41 is 60 mass % or more and 95 mass % or less with respect to the total mass of the first inorganic particles 41 and second inorganic particles 12, then it is possible to optimize both the amount of metal oxide particles necessary for inhibiting radiational heat transfer and the amount of silica nanoparticles necessary for inhibiting conductive/convectional heat transfer and for cushioning properties.

It is thought that, as a result, high heat-insulating properties are obtained with a satisfactory balance over a wide temperature range from temperatures during ordinary use of the battery to high temperatures of 500° C. and above, even when compressive force is imposed externally.

<Inorganic Fibers>

Examples of the inorganic fibers include ceramic fibers such as silica fibers, alumina fibers, aluminosilicate fibers, zirconia fibers, carbon fibers, soluble fibers, refractory ceramic fibers, aerogel composite materials, magnesium silicate fibers, alkaline-earth silicate fibers, potassium titanate fibers, and potassium titanate whisker fibers, glass-based fibers such as glass fibers and glass wool, and mineral fibers such as rock wool, basalt fibers, and wollastonite.

These inorganic fibers are preferred from the standpoints of heat resistance, strength, availability, etc. Especially preferred of those inorganic fibers from the standpoint of handleability are silica-alumina fibers, alumina fibers, silica fibers, rock wool, alkaline-earth silicate fibers, and glass fibers.

The cross-sectional shape of the inorganic fibers is not particularly limited, and examples thereof include a circular cross-section, a flat cross-section, a hollow cross-section, a polygonal cross-section, and a core cross-section. Of these, fibers having an unusual cross-section such as a hollow, flat, or polygonal cross-section are suitable for use because such fibers slightly improve the heat-insulating properties.

Unless the inorganic fibers have the special properties which will be described later, a preferred lower limit of the average fiber length of the inorganic fibers is 0.1 mm, and a more preferred lower limit thereof is 0.5 mm. Meanwhile, a preferred upper limit of the average fiber length of the inorganic fibers is 50 mm, and a more preferred upper limit thereof is 10 mm. In case where the average fiber length of the inorganic fibers is less than 0.1 mm, the inorganic fibers are less apt to be intertwined with each other and this may reduce the mechanical strength of the flameproof material 4. Meanwhile, in case where the average fiber length thereof exceeds 50 mm, the inorganic fibers, although having a reinforcing effect, cannot be tightly intertwined with each other, or the individual inorganic fibers separately become round and this is prone to form continuous voids and may hence result in a decrease in heat-insulating property.

Unless the inorganic fibers have the special properties which will be described later, a preferred lower limit of the average fiber diameter of the inorganic fibers is 1 μm, a more preferred lower limit thereof is 2 μm, and a still more preferred lower limit thereof is 3 μm. Meanwhile, a preferred upper limit of the average fiber diameter of the inorganic fibers is 15 μm, and a more preferred upper limit thereof is 10 μm. In case where the average fiber diameter of the inorganic fibers is less than 1 μm, the inorganic fibers themselves are likely to have reduced mechanical strength. From the standpoint of influences on human health, the average fiber diameter of the inorganic fibers is preferably 3 μm or larger. Meanwhile, in case where the average fiber diameter of the inorganic fibers is larger than 15 μm, there is a possibility that heat transfer by the inorganic fibers as a solid medium might be enhanced to result in a decrease in heat-insulating property and that the flameproof material might be deteriorated in shapability and strength.

Inorganic fibers of one kind may be used alone, or two or more kinds of inorganic fibers may be used in combination. The flameproof material 4 preferably includes first inorganic fibers 31 and second inorganic fibers 32 which differ from the first inorganic fibers 31 in at least one property selected from among, for example, average fiber diameter, shape, and glass transition point, as shown in FIG. 3. The inclusion of inorganic fibers of two kinds differing in property can improve the mechanical strength of the flameproof material 4 and the retention of inorganic particles.

(Inorganic Fibers of Two Kinds differing in Average Fiber Diameter and Fiber Shape)

In the case where the flameproof material 4 includes two kinds of inorganic fibers, it is preferable that the first inorganic fibers 31 have a larger average fiber diameter than the second inorganic fibers 32 and that the first inorganic fibers 31 are linear or acicular and the second inorganic fibers 32 are dendritic or curly. First inorganic fibers 31 which have a large average fiber diameter (thick) have the effect of improving the mechanical strength and shape retentivity of the flameproof material 4. That effect can be obtained by selecting two kinds of inorganic fibers so that one of the two kinds, for example, the first inorganic fibers 31, is thicker than the second inorganic fibers 32. There are cases where the flameproof material 4 receives external impacts, and the inclusion of the first inorganic fibers 31 in the flameproof material 4 enhances the impact resistance. Examples of the external impacts include pressing force due to the expansion of the battery cell and wind pressure due to the firing of the battery cell.

From the standpoint of improving the mechanical strength and shape retentivity of the flameproof material 4, the first inorganic fibers 31 especially preferably are linear or acicular. The term "liner or acicular fiber" means a fiber having a degree of crimpiness, which will be described later, of, for example, less than 10%, preferably 5% or less.

More specifically, from the standpoint of improving the mechanical strength and shape retentivity of the flameproof material 4, the average fiber diameter of the first inorganic fibers 31 is preferably 1 μm or larger, more preferably 3 μm or larger. In case where the first inorganic fibers 31 are too thick, this may result in a decrease in shapability or processability into the flameproof material 4. Hence, the average fiber diameter of the first inorganic fibers 31 is preferably 20 μm or less, more preferably 15 μm or less.

Incidentally, too large lengths of the first inorganic fibers 31 may result in a decrease in shapability or processability. The fiber length thereof is hence preferably 100 mm or less. Furthermore, since too small lengths of the first inorganic fibers 31 result in decreases in shape retentivity and mechanical strength, the fiber length thereof is preferably 0.1 mm or larger.

Meanwhile, second inorganic fibers 32 which have a small average fiber diameter (thin) have the effects of improving the retention of other inorganic fibers, inorganic particles, etc. and enhancing the flexibility of the flameproof material 4. It is hence preferable that the second inorganic fibers 32 are thinner than the first inorganic fibers 31.

More specifically, from the standpoint of improving the retention of other inorganic fibers, inorganic particles, etc., the second inorganic fibers 32 preferably are easy to deform and have flexibility. Hence, the second inorganic fibers 32 which are thin have an average fiber diameter of preferably less than 1 μm, more preferably 0.1 μm or less. It is, however, noted that thin inorganic fibers which are too thin are prone to break and are causative of a decrease in the retention of other inorganic fibers, inorganic particles, etc. In addition, a larger proportion of such too thin inorganic fibers are present in a mere intertwined state, without retaining other inorganic fibers, inorganic particles, etc., in the flameproof material 4, resulting not only in a decrease in the ability to retain other inorganic fibers, inorganic particles, etc. but also in poor shapability and poor shape retentivity. Because of this, the average fiber diameter of the second inorganic fibers 32 is preferably 1 nm or larger, more preferably 10 nm or larger.

In case where the second inorganic fibers 32 are too long, this results in decreases in shapability and shape retentivity. Hence, the fiber length of the second inorganic fibers 32 is preferably 0.1 mm or less.

The second inorganic fibers 32 preferably are dendritic or curly. The second inorganic fibers 32 having such a shape are intertwined with other inorganic fibers, inorganic particles, etc. in the flameproof material 4. Hence, the ability to retain other inorganic fibers, inorganic particles, etc. improves. Moreover, in cases when the flameproof material 4 and the elastic member 5 receive pressing force or wind pressure, the flameproof material 4 is inhibited from sliding and moving, by the intertwining of the first inorganic fibers 31 with the second inorganic fibers 32. This improves the mechanical strength especially against external pressing force and impacts.

The term "dendritic" means a two-dimensionally or three-dimensionally branched structure, and examples thereof are the shape of a feather, the shape of a tetrapod, a radial shape, and the shape of a three-dimensional network.

In the case where the second inorganic fibers 32 are dendritic, an average fiber diameter thereof can be obtained by examining the trunk and branches thereof with an SEM to measure the diameters of several portions thereof and calculating an average of the measured values.

The term "curly" means a structure in which the fiber is bent in various directions. Known as one method for quantifying a curly form is to calculate the degree of crimpiness from an electron photomicrograph thereof. For example, the degree of crimpiness can be calculated using the following formula.

$$\text{Degree of crimpiness (\%)}=[(\text{fiber length})-(\text{distance between fiber ends})]/(\text{fiber length})\times 100$$

Here, the fiber length and the distance between fiber ends are both values measured on the electron photomicrograph. That is, the fiber length is the length of the fiber projected on a two-dimensional plane, and the distance between fiber ends is the distance between the fiber ends projected on the two-dimensional plane; the measured values are smaller than the actual values. The degree of crimpiness of the second inorganic fibers 32, determined on the basis of that formula, is preferably 10% or higher, more preferably 30% or higher. In case where the degree of crimpiness thereof is too low, the ability to retain other inorganic fibers, inorganic particles, etc. is prone to be insufficient and the intertwining of the second inorganic fibers 32 themselves and the intertwining of the first inorganic fibers 31 with the second inorganic fibers 32 (network) are less apt to result.

In the embodiment described above, first inorganic fibers 31 and second inorganic fibers 32 which differed from the first inorganic fibers 31 in average fiber diameter and fiber shape were used as a means for improving the mechanical strength and shape retentivity of the flameproof material 4 and the retention of inorganic particles, inorganic fibers, etc. However, the mechanical strength and shape retentivity of the flameproof material 4 and the retention of particles can be improved also by using first inorganic fibers 31 and second inorganic fibers 32 which differ from the first inorganic fibers 31 in glass transition point and average fiber diameter.

As described above, it is preferred in this embodiment to use various combinations of inorganic fibers in order to improve the mechanical strength and shape retentivity of the flameproof material 4 and the retention of particles. Combinations of first inorganic fibers and second inorganic fibers, the combinations being different from that in the embodiment shown in FIG. 3, are described below. In this description, other embodiments regarding inorganic fibers are explained using FIG. 3 for reasons of convenience.

(Inorganic Fibers of Two Kinds differing in Glass Transition Point)

In the case where the flameproof material 4 includes two kinds of inorganic fibers, it is preferable that the first inorganic fibers 31 are amorphous fibers and the second inorganic fibers 32 are fibers of at least one kind selected from between amorphous fibers, having a higher glass transition point than the first inorganic fibers 31, and crystalline fibers. In cases when those two kinds of inorganic fibers are used together with first inorganic particles 41 including particles of at least one kind selected from among nanoparticles, hollow particles, and porous particles, the heat-insulating performance can be further improved.

Crystalline inorganic fibers have melting points which are usually higher than the glass transition points of amorphous inorganic fibers. Because of this, the first inorganic fibers 31, upon exposure to high temperatures, undergo surface softening earlier than the second inorganic fibers 32 to bind other inorganic fibers, inorganic particles, etc. Hence, the mechanical strength of the heat-insulating layer can be improved by incorporating such first inorganic fibers 31 into the flameproof material 4.

The first inorganic fibers 31 are specifically preferably inorganic fibers having a melting point lower than 700° C., and many kinds of amorphous inorganic fibers can be used. Preferred of these are fibers containing $SiO_2$. More preferred are glass fibers, because glass fibers are inexpensive and easily available and are excellent in terms of handleability, etc.

The second inorganic fibers 32 are fibers of at least one kind selected from between amorphous fibers, having a higher glass transition point than the first inorganic fibers 31, and crystalline fibers, as stated above. As the second inorganic fibers 32, many kinds of crystalline inorganic fibers can be used.

In cases when the second inorganic fibers 32 are either crystalline inorganic fibers or inorganic fibers having a higher glass transition point than the first inorganic fibers 31, the second inorganic fibers 32 do not melt or soften when the flameproof material 4 is exposed to a high temperature and even when the first inorganic fibers 31 soften. Consequently, even when the battery cell is undergoing thermal runaway, the second inorganic fibers 32 can retain the shape and continue to lie between the battery cells.

Furthermore, since the second inorganic fibers 32 do not melt or soften, the interstices among particles contained in the flameproof material 4, interstices between the particles and fibers, and fine spaces between the fibers are maintained and, hence, the heat-insulating effect of air is exhibited. Thus, the flameproof material 4 can retain excellent heat-transfer-inhibiting performance.

In the case where the second inorganic fibers 32 are crystalline, the following can be used as the second inorganic fibers 32: ceramic fibers such as silica fibers, alumina fibers, aluminosilicate fibers, zirconia fibers, carbon fibers, soluble fibers, refractory ceramic fibers, aerogel composite materials, magnesium silicate fibers, alkaline-earth silicate fibers, and potassium titanate fibers, glass-based fibers such as glass fibers and glass wool, and mineral fibers such as rock wool, basalt fibers, and wollastonite.

In cases when the second inorganic fibers 32 are any of those fibrous materials mentioned above which has a melting point exceeding 1,000° C., even when the battery cell undergoes thermal runaway, the second inorganic fibers 32 can retain the shape thereof without melting or softening. Such second inorganic fibers 32 are hence suitable for use.

Of the fibrous materials mentioned above as the second inorganic fibers 32, it is more preferred to use ceramic fibers such as, for example, silica fibers, alumina fibers, and aluminosilicate fibers and the mineral fibers. Still more preferred is to use, among those, a fibrous material having a melting point exceeding 1,000° C.

Even amorphous fibers can be used as the second inorganic fibers 32 so long as the amorphous fibers have a higher glass transition point than the first inorganic fibers 31. For example, glass fibers having a higher glass transition point than the first inorganic fibers 31 may be used as the second inorganic fibers 32.

One of the various inorganic fibrous materials enumerated as examples may be used alone as the second inorganic fibers 32, or a mixture of two or more of these may be used as the second inorganic fibers 32.

As stated above, since the first inorganic fibers 31 have a lower glass transition point than the second inorganic fibers 32 and soften first upon exposure to high temperatures, it is possible to bind other inorganic fibers, inorganic particles, etc. with the first inorganic fibers 31. However, in cases when, for example, the second inorganic fibers 32 are amorphous and have a smaller fiber diameter than the first inorganic fibers 31 and when the first inorganic fibers 31 have a glass transition point close to that of the second inorganic fibers 32, then there is a possibility that the second inorganic fibers 32 might soften first.

Consequently, in the case where the second inorganic fibers 32 are amorphous fibers, the glass transition point of the second inorganic fibers 32 is higher than the glass transition point of the first inorganic fibers 31 preferably by 100° C. or more, more preferably by 300° C. or more.

The first inorganic fibers 31 have a fiber length of preferably 100 mm or less and preferably 0.1 mm or longer. The second inorganic fibers 32 have a fiber length of preferably 0.1 mm or less. Reasons for these are as stated hereinabove.

(Inorganic Fibers of Two Kinds differing in Glass Transition Point and Average Fiber Diameter)

In the case where the flameproof material 4 includes two kinds of inorganic fibers, it is preferable that the first inorganic fibers 31 are amorphous fibers, that the second inorganic fibers 32 are fibers of at least one kind selected from between amorphous fibers, having a higher glass transition point than the first inorganic fibers 31, and crystalline fibers, and that the first inorganic fibers 31 have a larger average fiber diameter than the second inorganic fibers 32.

As stated above, in the case where the flameproof material 4 according to this embodiment includes two kinds of inorganic fibers, the first inorganic fibers 31 preferably have a larger average fiber diameter than the second inorganic fibers 32. It is also preferable that the first inorganic fibers 31 which are thick are amorphous fibers and that the second inorganic fibers 32 which are thin are fibers of at least one kind selected from between amorphous fibers, having a higher glass transition point than the first inorganic fibers 31, and crystalline fibers. In this configuration, since the first inorganic fibers 31 have a lower glass transition point and soften earlier, the flameproof material 4 becomes filmy and rigid as the temperature rises. Meanwhile, since the second inorganic fibers 32 which are thin are fibers of at least one kind selected from between amorphous fibers, having a higher glass transition point than the first inorganic fibers 31, and crystalline fibers, the second inorganic fibers 32 which are thin remain in the shape of fibers even when the temperature rises. The second inorganic fibers 32 hence can maintain the structure of the flameproof material 4 and prevent powder falling.

In this case also, the fiber length of the first inorganic fibers 31 is preferably 100 mm or less and preferably 0.1 mm or longer, and the fiber length of the second inorganic fibers 32 is preferably 0.1 mm or less. Reasons for these are as stated hereinabove.

The flameproof material 4 may contain different inorganic fibers besides the first inorganic fibers 31 and second inorganic fibers 32.

(Contents of First Inorganic Fibers and Second Inorganic Fibers)

In the case where the flameproof material 4 includes two kinds of inorganic fibers, the content of the first inorganic fibers 31 is preferably 3 mass % or more and 30 mass % or less with respect to the whole mass of the flameproof material and the content of the second inorganic fibers 32 is preferably 3 mass % or more and 30 mass % or less with respect to the whole mass of the flameproof material.

The content of the first inorganic fibers 31 is more preferably 5 mass % or more and 15 mass % or less with respect to the whole mass of the flameproof material, and the content of the second inorganic fibers 32 is more preferably 5 mass % or more and 15 mass % or less with respect to the whole mass of the flameproof material. By thus regulating the contents, the shape retentivity, resistance to pressing force, and resistance to wind pressure due to the first inorganic fibers 31 and the ability to retain inorganic particles due to the second inorganic fibers 32 are exhibited with a satisfactory balance.

<Organic Fibers>

The organic fibers 43 are not particularly limited, and use can be made of synthetic fibers, natural fibers, pulps, and the like. As the synthetic fibers, fibers made of heat-curing resins and thermoplastic resins can be selected. For example, use can be made of synthetic fibers including modified poly(ethylene terephthalate) (PET) fibers, polyethylene (PE) fibers, polypropylene fibers, polyester fibers, nylon fibers, poly(butylene terephthalate) fibers, poly(vinyl alcohol) (PVA) fibers, polyurethane fibers, ethylene/vinyl alcohol copolymer fibers, poly(trimethylene terephthalate) fibers, polyacetal fibers, polytetrafluoroethylene fibers, polyetheretherketone fibers, poly(phenylene sulfide) fibers, polyamide fibers, poly(p-phenylphthalamide) fibers, and the like.

The kinds, structures, etc. of synthetic fibers usable in this embodiment are explained in greater detail below.

Vinylon: fibers made of a long-chain synthetic polymer including at least 65 mass % vinyl alcohol units.

Vinylal: fibers made of a long-chain synthetic poly(vinyl alcohol) polymer having a different degree of acetalization.

Poly(vinyl chloride) (chlorofiber): fibers made of a long-chain synthetic polymer including vinyl chloride units as a main component.

Vinylidene (poly(vinylidene chloride), chlorofiber): fibers made of a long-chain synthetic polymer including vinylidene chloride units ($—CH_2—CCl_2—$) as a main component.

Acrylic: fibers made of a long-chain synthetic polymer including at least 85 mass % repeating units of acrylonitrile group.

Modacrylic: fibers made of a long-chain synthetic polymer including repeating units of acrylonitrile group in an amount of 35 mass % or larger but less than 85 mass %.

Nylon (polyamide); fibers made of a long-chain synthetic polymer in which 85% or more of repeating amide bonds are bonded to aliphatic or alicyclic units.

Aramid: fibers made of a long-chain synthetic polymer in which 85 mass % or more of amide or imide bonds are each directly bonded to two benzene rings and the number of imide bonds, if any, does not exceeds the number of amide bonds.

Polyester: fibers made of a long-chain synthetic polymer including at least 85 mass % units of an ester of terephthalic acid with a dihydric alcohol.

Poly(ethylene terephthalate) (PET): fibers made of a long-chain synthetic polymer including at least 85 mass % units of an ester of terephthalic acid with ethylene glycol.

Poly(trimethylene terephthalate) (PTT): fibers made of a long-chain synthetic polymer including at least 85 mass % units of an ester of terephthalic acid with 1,3-propanediol.

Poly(butylene terephthalate) (PBT): fibers made of a long-chain synthetic polymer including at least 85 mass % units of an ester of terephthalic acid with 1,4-butanediol.

Polyethylene (PE): fibers made of a long-chain synthetic polymer formed from a saturated aliphatic hydrocarbon and having no substituents.

Polypropylene (PP): fibers made of a long-chain synthetic polymer which is a polymer formed from a saturated aliphatic hydrocarbon and having a methyl side chain bonded to one of every two carbon atoms and which has stereoregularity and has no other substituents.

Polyurethane (elastane): fibers made of a long-chain synthetic polymer which includes 85 mass % or more polyurethane segment and which, when elongated three times the tension-free length, rapidly recovers the original length upon release from the tension.

Poly(lactic acid) (polylactide): fibers made of a long-chain synthetic polymer including lactic ester units in an amount of 50 mass % or larger.

Preferred ranges of the average fiber length and average fiber diameter of the organic fibers 43 are the same as those of inorganic fibers.

<Other Materials>

The flameproof materials 4 usable in this embodiment may contain ingredients, such as a binding material and a colorant, necessary for shaping into flameproof materials, besides the first inorganic particles 41 and second inorganic particles 12, the first inorganic fibers 31 and second inorganic fibers 32, and the organic fibers 43. Such other ingredients are described in detail below.

(Binding Material)

The flameproof materials 4 of the present invention, even when containing no binding material such as a binder 9, can have been formed by sintering, etc. However, especially in cases when the flameproof materials 4 contain silica nanoparticles, it is preferred to add a binding material in an appropriate amount in order to enable the flameproof materials 4 to retain the shape thereof. In the present invention, the binding material is only required to function as a binding material for holding inorganic particles, and may be in any form such as, for example, a binder involving bonding, fibers to be physically entwined with particles, or a heat-resistant resin which adheres by the tackiness thereof. The first inorganic fibers 31 and the second inorganic fibers 32 also function as a binding material.

As the binder 9, use can be made of an organic binder, an inorganic binder, etc. In the present invention, there are no particular limitations on the kinds of such binders. As the organic binder, use can be made of a polymeric coagulant, an acrylic emulsion, or the like. As the inorganic binder, use can be made, for example, of a silica sol, an alumina sol, or aluminum sulfate. These bonders function as adhesives after removal of the solvent, e.g., water.

In each flameproof material 4 to be used in the present invention, the content of the binding material is preferably 60 mass % or less, more preferably 50 mass % or less, with respect to the whole mass of the flameproof material. In the flameproof material 4 to be used in the present invention, the content of the binding material is preferably 10 mass % or higher, more preferably 20 mass % or higher, with respect to the whole mass of the flameproof material.

The thickness of each flameproof material 4 to be used in the present invention is not particularly limited, but is preferably in the range of 0.1 mm or more and 30 mm or less. In cases when the thickness of the flameproof material 4 is within that range, not only sufficient heat-insulating properties and mechanical strength can be obtained but also shaping is easy.

[Elastic Members]

The elastic members 5 to be used in the assembled battery 6 according to this embodiment can be ones that have both elasticity which enables the elastic members to deform flexibly in accordance with deformations of the battery cells 2 and stretchability which enables the elastic members to absorb the expansion/contraction of the battery cells 2 and press the battery cells 2 when the flameproof sheet 10 has been disposed between adjoining battery cells 2 or when the elastic members 5 have been attached to battery cells 2 covered with the flameproof materials 4. As such elastic members 5, a rubber of an elastomer can, for example, be used.

The elastic members 5 shown in FIG. 2 are each a tubular body which is open at both ends and in which the outer surface and the inner surface are smooth. However, the shape of the elastic members 5 is not limited to that shown in FIG. 2.

Figure 4:
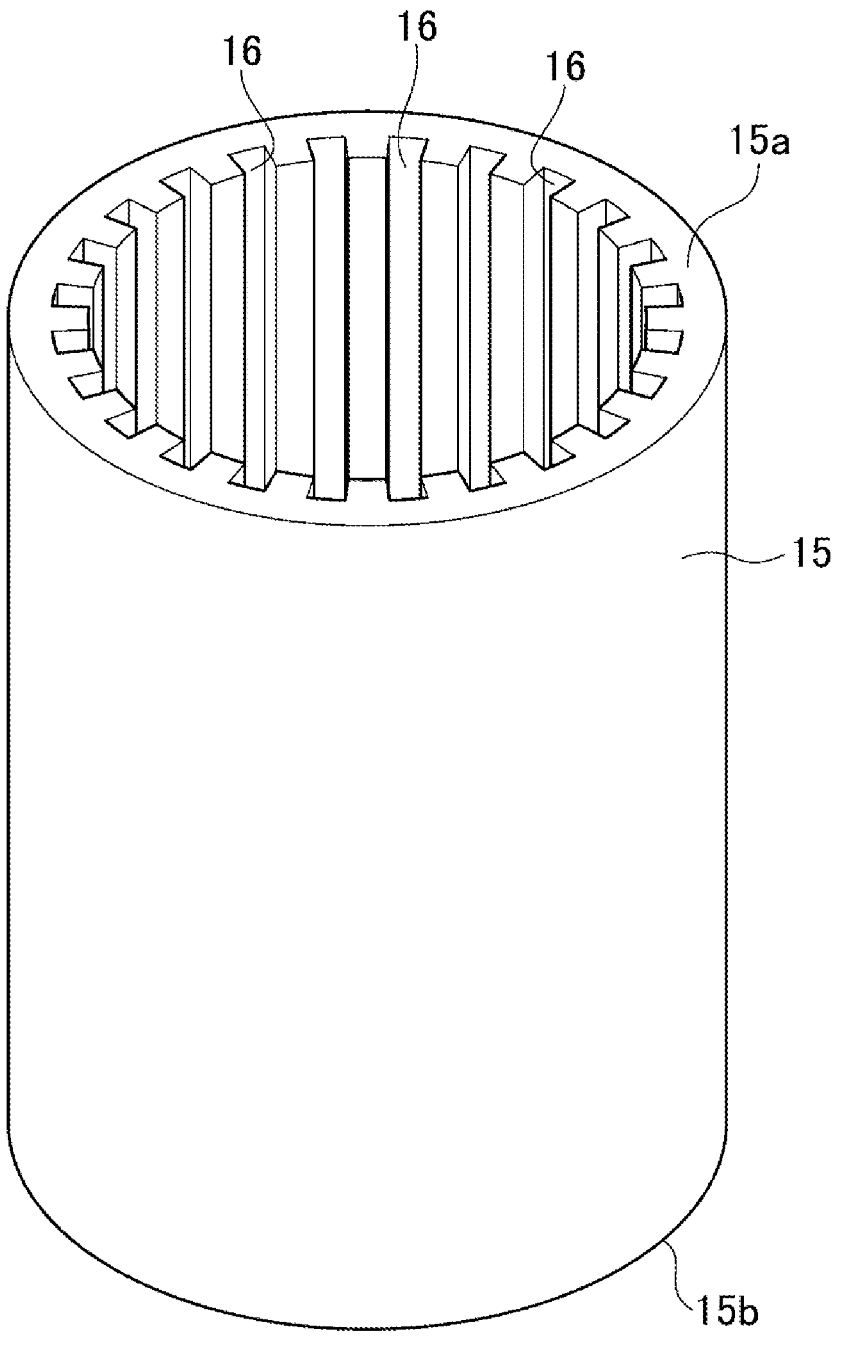
FIG. 4 is a slant view showing a shape example of elastic members applicable to an assembled battery according to an embodiment of the present invention.

FIG. 4 is a slant view showing a shape example of elastic members applicable to an assembled battery according to an embodiment of the present invention. Elastic members having the shapes shown below can all be used in place of the elastic members 5 of the assembled battery 6 shown in FIG. 2. The effects, etc. of elastic members having the various shapes shown below are hence explained on the assumption that the elastic members have been applied to the assembled battery 6.

As FIG. 4 shows, the inner surface of the elastic member 15, which is a tubular body, has a plurality of grooves 16 formed therein which extend from one end 15*a* to the other end 15*b* of the elastic member 15. In this embodiment, the terms "one end 15*a*" and "the other end 15*b*" for the elastic member 5 (tubular body) respectively mean one longitudinal-direction (top-bottom direction in FIG. 4) end and the other longitudinal-direction end of the elastic member 5. That is, those terms mean the open ends of the tubular body.

An assembled battery employing elastic members 15 thus configured functions as follows like the assembled battery 6 shown in FIG. 2. In case where a battery cell 2 has heated up to a high temperature, the flameproof material 4 inhibits the heat from being transferred and the elastic member 15 deforms in accordance with the deformation of the battery cell 2 while inhibiting the deformation of the battery cell 2. It is hence possible to inhibit the battery case 7 from being damaged and the battery cells 2 from decreasing in battery performance.

Furthermore, since the elastic member 15 has grooves 16 in the inner surface thereof, spaces are formed between the elastic member 15 and the flameproof material 4. Because of this, in cases when some of the heat was unable to be inhibited by the flameproof material 4 from being transferred and has been transferred to the elastic member 15 side, the gas in the spaces is heated and the high-temperature gas is discharged from the spaces to the one end 15*a* side and the other end 15*b* side of the elastic member 15. As a result, a fresh gas is introduced into the spaces and the battery cell 2 can hence be effectively cooled.

The grooves 16 formed in the elastic member 15 are not particularly limited in the number, depth, peripheral-direction width, etc. thereof. By changing the number, depth, and peripheral-direction width of the grooves 16, the elasticity, stretchability, etc. of the elastic member 15 can be changed. It is hence possible to variously design the grooves 16 in accordance with required properties and the size of that region of the battery case 7 which is for encasing the battery cell 2 therein.

The grooves 16 need not be always formed in a direction parallel with the longitudinal direction of the elastic member 15. However, from the standpoint of preventing the heat of the battery cell 2 from being transferred to adjoining battery cells 2, it is preferred to discharge the heated gas to the electrode surface 2*a* side of the battery cell 2 and to the side where the surface facing the electrode surface 2*a* is present. Consequently, in the case of forming grooves 16, the grooves 16 may be formed so as to extend from the one end 15*a* to the other end 15*b* of the elastic member 15.

In cases when grooves 16 have been formed so as not extend in a direction parallel with the longitudinal direction of the elastic member 15 but to have a given angle with the parallel direction, it is possible to cool a wider area in the surface of the battery cell 2. The grooves 16 may have been formed either helically or curvedly.

The given angle is preferably larger than 0° with respect to the parallel direction. Meanwhile, the given angle is preferably 450 or less because the heated high-temperature gas can be efficiently discharged, and is more preferably 300 or less.

Figure 5:
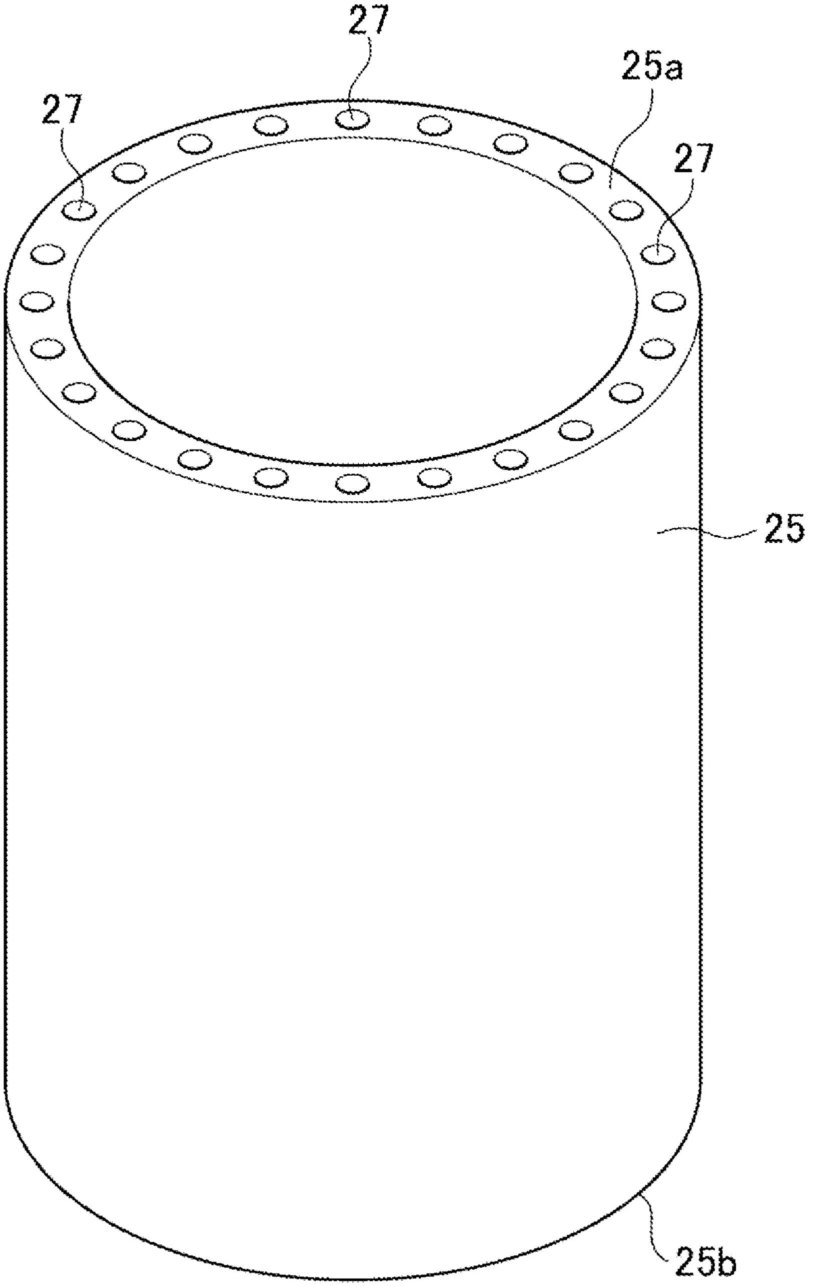
FIG. 5 is a slant view showing another shape example of elastic members applicable to the assembled battery according to an embodiment of the present invention.

FIG. 5 is a slant view showing another shape example of elastic members applicable to the assembled battery according to an embodiment of the present invention. As FIG. 5 shows, the elastic member 25, which is a tubular body, is one in which the inner surface and the outer surface are smooth as in the elastic members 5 shown in FIG. 2, but has a plurality of through holes 27 in an inner portion thereof which pierce the elastic member 25 from one end 25*a* to the other end 25*b*.

Also, in an assembled battery employing elastic members 25 thus configured, it is possible to obtain the same effects as in the case where the elastic members 5 and the elastic members 15 are used. Since each elastic member 25 has through holes 27 in the thickness-direction inner portion, the inside of each through hole 27 is a space. Consequently, in cases when heat generated by the battery cell 2 has reached the elastic member 25, the gas in the through holes 27 is heated and the resultant high-temperature gas is discharged from the through holes 27 to the one end 15*a* side and the other end 15*b* side of the elastic member 25. As a result, a fresh gas is introduced into the through holes 27 and the battery cell 2 can be efficiently cooled.

The through holes 27 formed in the elastic member 25 are not particularly limited in the number, size, etc. thereof. As in the elastic member 15 shown in FIG. 4, the through holes 27 can be variously designed in accordance with properties required of the elastic member 25 and the size of that region of the battery case 7 which is for encasing the battery cell 2 therein.

The through holes 27 need not be always formed in a direction parallel with the longitudinal direction of the elastic member 25. In the case of forming through holes 27, the through holes 27 may be formed so as to extend from the one end 25*a* to the other end 25*b* of the elastic member 25.

In cases when through holes 27 have been formed so as not to extend in a direction parallel with the longitudinal direction of the elastic member 25 but to have the given angle with the parallel direction, it is possible to cool a wider area in the surface of the battery cell 2. Note that the through holes 27 may have been formed either helically or curvedly.

Figure 6:
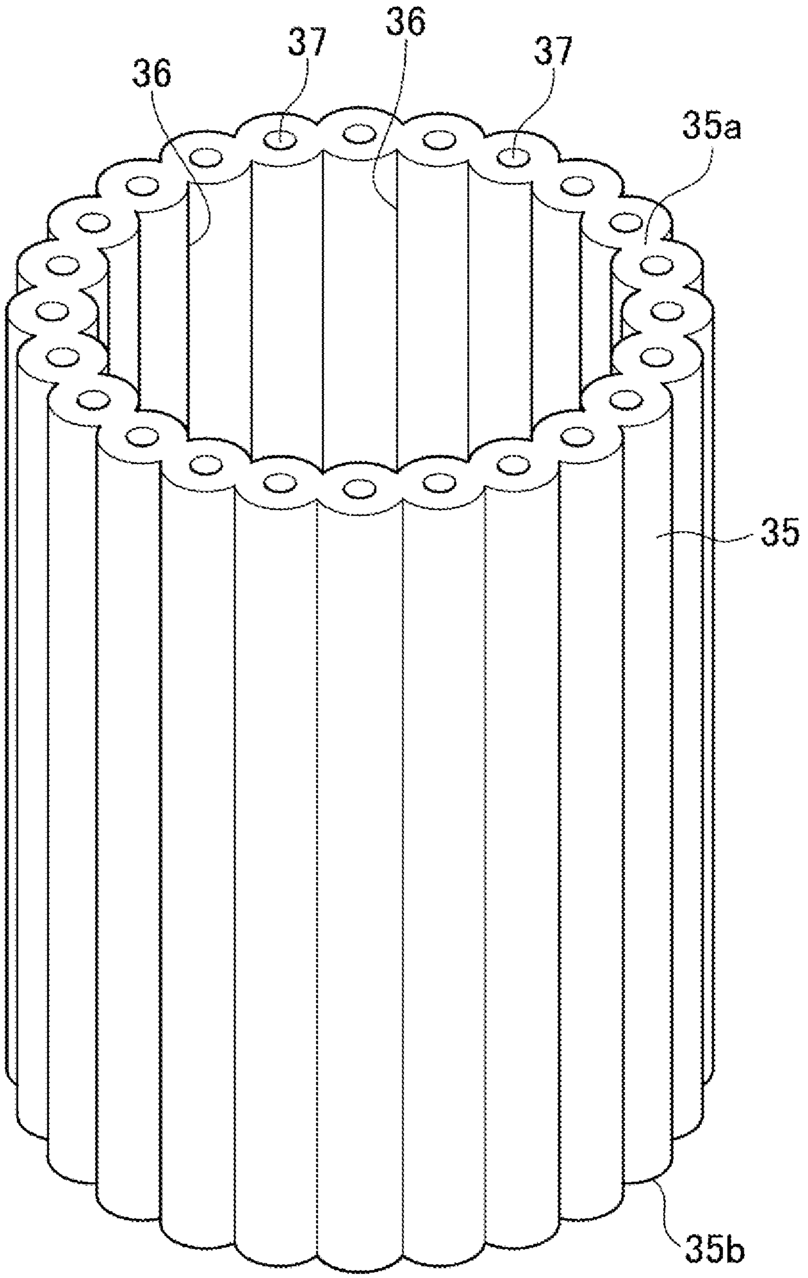
FIG. 6 is a slant view showing still another shape example of elastic members applicable to the assembled battery according to an embodiment of the present invention.

FIG. 6 is a slant view showing still another shape example of elastic members applicable to the assembled battery according to an embodiment of the present invention. As FIG. 6 shows, the elastic member 35, which is a tubular body, has a shape formed by disposing a plurality of tubes side-by-side along the longitudinal direction thereof and bonding the adjoining surfaces to each other. Consequently, the elastic member 35 has a plurality of grooves 36 formed in the inner surface thereof like the elastic member 15 shown in FIG. 4, and has a plurality of through holes 37 in a thickness-direction inner portion thereof which pierce the elastic member 35 form one end 35*a* to the other end 35*b*, like the elastic member 25 shown in FIG. 5.

Also, in an assembled battery employing elastic members 35 thus configured, it is possible to obtain the same effects as in the case where the elastic members 5, 15, and 25 are used. Each elastic member 35 has the grooves 36 to form spaces between the elastic member 35 and the flameproof material 4 and further has the through holes 37. Consequently, the spaces coupled with the through holes 37 enhance the effect of discharging the heated gas to the one end 35*a* side and the other end 35*b* side of the elastic member 35, making it possible to more effectively cool the battery cell 2.

The number and size of the through holes 37 to be formed in the elastic member 35 and the depth, etc. of the grooves 36 to be formed in the elastic member 35 can be suitably designed.

As in the case of the elastic member 15 and the elastic member 25, in cases when grooves 36 or through holes 37 have been formed so as to not to extend in a direction parallel with the longitudinal direction of the elastic member 35 but to have the given angle with the parallel direction, it is possible to cool a wider area in the surface of the battery cell 2. The grooves 36 and the through holes 37 may have been formed either helically or curvedly.

The elastic members shown in FIG. 4 to FIG. 6 all have a tubular shape. However, in the case of application to the flameproof sheet 10 shown in FIG. 1, the elastic members 5 need not be tubular bodies. That is, use can be made of materials obtained by opening the elastic members shown in FIG. 4 to FIG. 6 into a sheet form. Specifically, each elastic member 5 shown in FIG. 1 may have a plurality of grooves extending from one edge surface orthogonal to the surfaces facing the flameproof materials 4 toward the other edge surface, which faces said one edge surface.

The elastic member 5 may have a plurality of through holes piercing the elastic member 5 from one edge surface orthogonal to the surfaces facing the flameproof materials 4 to the other edge surface, which faces said one edge surface.

Furthermore, the elastic member 5 may have the grooves and the through holes simultaneously.

In the case of using sheet-shaped elastic members 5, it is preferred to dispose the elastic members 5 so that the grooves or through holes extend in a direction along which heat is desired to be dissipated.

[Supporting Layer]

Although the flameproof sheet 10 according to this embodiment includes the flameproof materials 4 and, for example, the elastic member 5 as described above, it is preferred to further dispose a supporting layer (not shown) between a flameproof material and the elastic member. The supporting layer has the effects of supporting the shape of the flameproof material and maintaining the strength of the flameproof sheet. The inclusion of the supporting layer in the flameproof sheet 10 is effective in preventing the pressing force due to a deformation of the battery cell from being applied to a part of the flameproof material and in inhibiting the flameproof material from breaking.

As a material for forming the supporting layer, use can be made of a material having a lower modulus of elasticity and a higher hardness than the elastic member. For example, a supporting layer including an organic material or an inorganic material as a main material can be used. In cases when an organic material was used as a main material for supporting-layer formation, the supporting layer itself is flexible and, hence, the flameproof sheet also has flexibility and can facilitate fabrication of an assembled battery. Meanwhile, in cases when an inorganic material was used as a main material for supporting-layer formation, the supporting layer itself has heat resistance and, hence, the heat resistance of the flameproof sheet can be further improved.

The supporting layer may have a structure obtained by laminating two or more layers differing in material. Meanwhile, the supporting layer may be one in which at least one surface contains the material of the flameproof material and/or the material of the elastic member and which has been integrated with the flameproof material or the elastic member. In cases when the flameproof sheet has such a structure in which the supporting layer has been integrated with the flameproof material and/or the elastic member, it is possible to obtain not only the effect of improving the strength of the flameproof sheet but also the effect of inhibiting a position shift between the elastic member and the flameproof material due to sliding. In addition, a dusting-inhibiting effect can also be obtained. More preferred is a structure in which one surface of the supporting layer contains the material of the flameproof material, the other surface contains the material of the elastic member, and the flameproof material and the elastic member have been integrated with each other by the supporting layer interposed therebetween. This structure can further enhance the effect of inhibiting positional shifting and the effect of inhibiting dusting.

The thickness of the supporting layer is not particularly limited. However, the supporting layer is preferably thinner than the elastic member from the standpoint of obtaining a sufficient space for disposing the elastic member and the flameproof materials. Hence, the thickness of the supporting layer is preferably 0.5 or more and 30% or less, more preferably 1.0% or more and 10% or less, with respect to the thickness of the elastic member. Even in the structure in which the supporting layer has been integrated with the elastic member, the relationship between the thickness of the portion that constitutes the supporting layer and the thickness of the portion that constitutes the elastic member is preferably within that range.

<Battery Case>

The battery case 7 for encasing therein the assembled battery 6 according to this embodiment shown in FIG. 2 is not particularly limited in the material and shape thereof. Besides being a polycarbonate, the material of the battery case 7 can be PP, PET, a polyamide (PA), aluminum, stainless steel (steel use stainless: SUS), or the like. The shape of the battery case 7 can be selected at will in accordance with the device, e.g., power tool, to which the assembled battery 6 is to be applied.

Incidentally, in the assembled battery 6 according to this embodiment shown in FIG. 2, each battery cell 2 by itself has heat-insulating properties and the expansion/contraction of each battery cell 2 does not affect other regions. These battery cells 2 hence may not have been encased in the battery case 7. For example, a plurality of battery cells 2 each covered with a flameproof material 4 and an elastic member 5 may be tied up with a band or the like to configure an assembled battery and this assembled battery as such can be mounted in a device, e.g., a power tool. In such cases when a plurality of battery cells 2 each covered with a flameproof material 4 and an elastic member 5 are disposed so as to adjoin each other, without using a battery case 7, the part lying between adjoining battery cells 2 has the same configuration as the flameproof sheet 10 shown in FIG. 1.

[Method for fabricating Assembled Battery]

The assembled battery according to this embodiment shown in FIG. 1 can be easily fabricated by disposing flameproof sheets 10 between battery cells 2. The assembled battery 6 according to this embodiment shown in FIG. 2 can be easily fabricated, as an assembled battery showing the effects described above, merely by covering each of battery cells 2 with a flameproof material 4 and putting an elastic member 5 which is, for example, a tubular body on each of the covered battery cells 2. Since a flameproof material 4 and an elastic member 5 are attached to each of the battery cells 2, a complicated design is unnecessary for the battery case 7.

In this embodiment, in cases when the flameproof materials 4 are sheet-shaped ones, the flameproof materials 4 each can be easily processed into a size suitable for covering the peripheral surface of a battery cell 2 or into a desired size regardless of the shape or size of the battery cell 2. In cases when the elastic members 5 are tubular, the elastic members 5 can be attached to various battery cells 2 without being affected by the shapes and sizes of the battery cells 2, since the elastic members 5 have stretchability.

The assembled battery and battery pack according to this embodiment can be favorably used not only in power tools but in power-assisted bicycles, electric two-wheeled vehicles, electric vehicles, etc.

The assembled battery of this embodiment is not limited to the assembled batteries shown as examples in FIG. 1 and FIG. 2, and the flameproof sheet 10 can be disposed not only between adjoining battery cells 2 but also between a battery cell 2 and a case (e.g., a battery case 30) disposed on the outer side thereof.

In the assembled battery thus configured, in case where a battery cell has fired, the flame can be inhibited from spreading beyond the battery case.

For example, the assembled battery according to this embodiment is used in an electric vehicle (EV) or the like and may be disposed beneath the floor, under the passengers. In this case, if one of the battery cells fires, the safety of the passengers can be ensured.

Furthermore, since the flameproof sheet 10 can not only be interposed between the battery cells but also be disposed between a battery cell 2 and the battery case, there is no need of newly producing a flameproof material or the like. A safe assembled battery can hence be easily configured at low cost.

In the assembled battery of this embodiment, in cases when the flameproof sheet 10 has been disposed between a battery cell 2 and the battery case, the flameproof sheet 10 and the battery cell 2 may be in contact with each other or may have a gap therebetween. However, even in the case where the flameproof sheet 10 and the battery cell 2 have no gap therebetween, the flameproof sheet 10, when any one of the battery cells has heated up and expanded, can allow the battery cell to deform because the flameproof sheet 10 includes an elastic member 5.

Various embodiments were explained above while referring to the drawings, but it is a matter of course that the present invention is not limited to those examples. It is apparent that a person skilled in the art can conceive of variously modified or changed examples within the scope of the claims, and these examples are, of course, considered to be within the technical range of the present invention. The various constituent elements in the embodiments described above may be combined at will so long as the combinations do not depart from the spirit of the invention.

REFERENCE SIGNS LIST

1: Battery pack
2: Battery cell
2*a*: Electrode surface
3: Electrode
4: Flameproof material
5, 15, 25, 35: Elastic member
6: Assembled battery
7: Battery case
9: Resin binder
10: Flameproof sheet
12: Second inorganic particle
16, 36: Groove
27, 37: Through hole
31: First inorganic fiber
32: Second inorganic fiber
41: First inorganic particle
43: Organic fiber

The invention claimed is:

1. A flameproof sheet for use in an assembled battery in which a plurality of battery cells is connected serially or in parallel, the battery cells each having an electrode surface having an electrode and a peripheral surface orthogonal to the electrode surface and being disposed such that the peripheral surfaces face each other, the flameproof sheet comprising a pair of flameproof materials and an elastic member disposed between the pair of flameproof materials; wherein the flameproof materials contain inorganic fibers;

wherein the flameproof materials include first inorganic fibers and second inorganic fibers, the first inorganic fibers and the second inorganic fibers differing from each other in at least one property selected from among average fiber diameter, shape, and glass transition point.

2. The flameproof sheet according to claim 1, wherein the elastic member has a plurality of grooves extending from one edge surface thereof orthogonal to surfaces thereof facing the flameproof materials to the other edge surface.

3. The flameproof sheet according to claim 1, wherein the elastic member has a plurality of through holes piercing the elastic member from one edge surface thereof orthogonal to surfaces thereof facing the flameproof materials to the other edge surface.

4. The flameproof sheet according to claim 1, wherein the elastic member is made of a rubber or an elastomer.

5. The flameproof sheet according to claim 1, wherein the first inorganic fibers have a larger average fiber diameter than the second inorganic fibers, and the first inorganic fibers are linear or acicular and the second inorganic fibers are dendritic or curly.

6. The flameproof sheet according to claim 1, wherein the first inorganic fibers are amorphous fibers, the second inorganic fibers are fibers of at least one kind selected from between amorphous fibers, having a higher glass transition point than the first inorganic fibers, and crystalline fibers, and the first inorganic fibers have a larger average fiber diameter than the second inorganic fibers.

7. The flameproof sheet according to claim 1, wherein the flameproof materials contain inorganic particles, the inorganic particles comprising particles of at least one kind selected from among nanoparticles, hollow particles, and porous particles, the first inorganic fibers are amorphous fibers, and the second inorganic fibers are inorganic fibers of at least one kind selected from between amorphous fibers, having a higher glass transition point than the first inorganic fibers, and crystalline fibers.

8. The flameproof sheet according to claim 1, wherein the first inorganic fibers are amorphous fibers, and wherein the second inorganic fibers are fibers of at least one kind selected from between amorphous fibers having a higher glass transition point than the first inorganic fibers, or crystalline fibers.

9. An assembled battery comprising a plurality of battery cells and the flameproof sheet according to claim 1, wherein the plurality of battery cells is connected serially or in parallel.

10. A battery pack in which the assembled battery according to claim 9 is encased in a battery case.

* * * * *